United States Patent [19]

Chen

[11] 4,244,318
[45] Jan. 13, 1981

[54] THIN PARTICULATE FILM SPIN COATER

[75] Inventor: T. F. Chen, Dresher, Pa.

[73] Assignee: Sperry Corporation, New York, N.Y.

[21] Appl. No.: 108,427

[22] Filed: Dec. 31, 1979

[51] Int. Cl.$^3$ .......................... B05C 5/02; B05C 11/08
[52] U.S. Cl. ........................................ 118/52; 118/600
[58] Field of Search ................................. 118/52–57, 118/600; 427/240, 241

[56] References Cited

U.S. PATENT DOCUMENTS

| | | | |
|---|---|---|---|
| 3,033,159 | 5/1962 | O'Brien | 118/52 X |
| 3,132,967 | 5/1964 | Spraul et al. | 118/56 X |
| 3,672,932 | 6/1972 | D'Augustine | 427/240 X |
| 4,075,974 | 2/1978 | Plows et al. | 118/52 |
| 4,173,942 | 11/1979 | Plattner | 118/56 X |

FOREIGN PATENT DOCUMENTS 736301   6/1943   Fed. Rep. of Germany ............ 118/55

*Primary Examiner*—Morris Kaplan
*Attorney, Agent, or Firm*—Rene A. Kuypers

[57] ABSTRACT

A device for spincoating an ultra-thin iron powder film on a disk for magnetic recording. Ultra-thin films are utilized on magnetic disks in view of a high density recording that may be achieved on such devices. The invention develops an iron powder particulate composition which is pre-sheared to a particular consistency within a spin chamber which is compartmented by perforated vanes, disposed on a common axis with and above the magnetic disk, and is selectively coupled to the drive shaft of the disk spinner. Magnetic means are actuable to raise the bell-type cover of the spin chamber whereby to discharge coating material onto the spinning disk. Means decouple the chamber from the drive shaft and vary the spin rate of said shaft to effect the desired thinness of coating.

10 Claims, 1 Drawing Figure

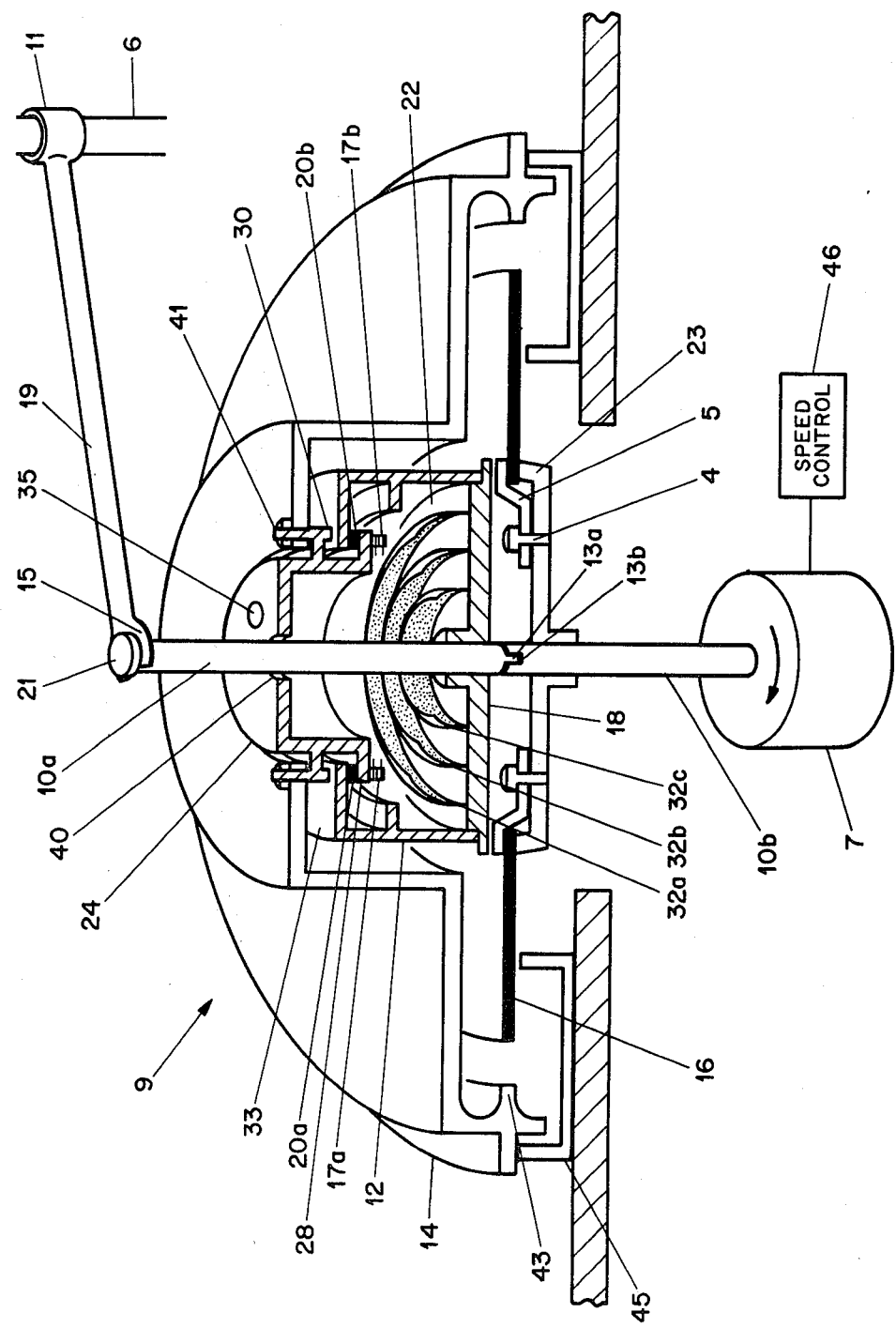

THIN PARTICULATE FILM SPIN COATER

BACKGROUND OF THE INVENTION

1. Field of the Invention

The present invention relates to the field of magnetic film coatings and in particular to apparatus for applying magnetic films of the particulate type.

2. Description of the Prior Art

Disk devices which are spin coated with a thin particulate film have not been entirely satisfactory because they have not achieved a film thinness which is sufficient to develop the bit packing densities and resolution desired in present day magnetic recording. Prior art particulate film thicknessess are on an order of 50–100 microinches. The known prior art, it is believed, has not developed a quantum jump in particulate film thicknesses on an order of one-half the above-mentioned thickness because it has not developed apparatus that enables spin coating of the iron particulate to occur over a relatively long period of fabrication time. In other words, the longer that the composition is able to remain in a Newtonian state, the longer spinning can take place and the thinner the final coating surface.

BRIEF SUMMARY OF INVENTION

The invention discloses apparatus for depositing an ultra-thin iron particulate (consisting of minute iron particles) film on a metal disk substrate by a technique known as spin coating. Apparatus comprised essentially of a pre-mix chamber located at the center of the disk to be spin-coated is utilized to pre-shear a thixotropic composition (i.e., the more it is mixed, the thinner its viscosity) consisting of the iron powder particles, a resin binder to hold the iron particles, and a solvent for thinning the composition. When the composition reaches a Newtonian state (i.e., when composition reaches its lowest viscosity), the composition is gated by centrifugal force onto the disk substrate surface so that the composition is spun uniformly onto the disk with the desired thinness. A hood is positioned over the disk during the spinning in order to prevent rapid evaporation of the solvent so that relatively long spinning time can be achieved and the ultra-thin film can be provided.

BRIEF DESCRIPTION OF THE DRAWING

The drawing included herewith is a sectional view of the spin coater apparatus utilized for applying an ultra-thin film to a disk substrate.

DESCRIPTION OF THE PREFERRED EMBODIMENT

Referring now to the FIGURE of drawing in greater detail, there is depicted the spin coater assembly 9 of the present invention wherein an upper surface of disk 16 is to be spin coated with an ultra thin particulate film (not shown). While the present invention will be discussed with respect to fabricating an upper magnetic surface to disk 16, nevertheless, it should be understood that the disk's under surface may be coated either simultaneously or sequentially, utilizing apparatus and technique disclosed herein. The substrate of disk 16, prior to spin coating a particulate film thereon, is made of Aluminium 7075 (computer grade) which has an outside diameter of 14 inches and includes a circular opening at its center having a diameter of 6.6 inches. The spin coating assembly 9 includes a motor 7 for rotating disk 16 at any of four speeds. The reason for the four speed arrangement will be discussed in greater detail in later paragraphs. Manual switch means or automatic control means (not shown) are used to allow the motor 7 to run at any of the four speeds for a required period of time.

When the disk 16 is being made ready for spin coating, it is located in the spin coating assembly 9 so that its center is positioned through lower shaft 10b emanating from motor 7. The end of shaft 10b is fabricated so that it includes a female slot member 13b. Connected to shaft 10b near the female slot 13b is a mounting base 23 for receiving the disk 16. When disk 16 is readied for spin coating, it is positioned upon mounting base 23 and then clamped thereto by a disk clamp 5 which holds the disk 16 securely by means of appropriate bolt means 4. It can therefore be readily appreciated that the disk 16 will rotate in unison with lower shaft 10b, mounting base 23 and disk clamp 5.

Upper shaft 10a has a male key 13a formed at its end which may be coupled and decoupled from the female member 13b on lower shaft 10b. The upper shaft 10a is permanently secured to a circular bottom section 18 of a pre-mix chamber 22. The pre-mix chamber 22 is an enclosed member for mixing various ingredients which will be utilized to form a hardened particulate film on the aluminum substrate disk 16 and its structural components will be discussed below. Located upon bottom section 18 of mix chamber 22 is a mixing apparatus 32 comprising three vertically arranged vanes 32a, b, and c. The vanes 32a, b, and c may be made of sheet metal or nylon which have holes on an order of 1/16 of an inch diameter located in juxtaposition to one another over the vanes' respective surfaces. The vanes 32a, b, and c which have a spacing on an order of $\frac{1}{2}$–$\frac{3}{4}$ of an inch are slightly curved at their respective upper portions in order to aid in the mixing function that they provide. A circular side-wall 12 made of light gauge Aluminum is positioned with respect to the bottom section 18 made of steel to provide a snug fitting to prevent fluid leakage when in a position shown in the drawing. The pre-mix chamber 22 is enclosed by a circular cover 33 also made of light gauge Aluminum which is attached to the side wall 12. However, a circular opening is provided in the center of cover 33 in order that a circular enclosure 24 may be positioned therein. This aspect of the invention will be discussed in a later paragraph.

Returning again to the pre-mix chamber 22, the circular side wall 12 and cover 33 may be lifted upward from bottom section 18 so that an annular opening is formed between bottom section 18 and side wall 12 in order to allow removal or gating of a composition contained within. Lifting of a side wall 12 and cover 33 is accomplished magnetically by means of electrical coils 17a, 17b which are positioned on an underside of lip 28 which is attached to a circular enclosure 24. A plurality of such coils are judiciously positioned around cover 33 in order to provide an adequate lifting function. Similarly, permanent magnets 20a, 20b are positioned in juxtaposition to the coils 17a, 17b and under the cover 33 so that the energizing and non-energizing of the coils have an influence on the permanent magnets. Thus, a North pole of the magnets 20a, 20b is located near the ends of coils 17a, 17b such that when the coils are in an unenergized state, they have no influence on the permanent magnets and therefore the pre-mix chamber 22 fits snugly on its bottom section 22. On the other hand, when the coils 17a, 17b are energized, a North pole will be produced at its ends closest to the North poles of the permanent magnets 20a, 20b and therefore there will be a repulsion developed between the permanent magnets and the ends of the coils. This magnetic repulsion causes the pre-mix chamber cover comprising its circular side walls 12 and cover 33 to be lifted from the circular bottom section 18. The lifting of the side wall and cover permits a gating or release of the composition that is contained within the pre-mix chamber 22. A stop 30 (only two of which are shown) attached to the circular enclosure 24 is provided to limit the height to which the cover 33 and side wall 12 are lifted.

As previously mentioned, a circular opening is provided in the center of cover 33 in order that a circular enclosure 24 may be positioned therein. The enclosure 24, which has a circular opening 40 so that it may fit around the upper shaft 10a, is utilized not only for retaining a plurality of coils such as 17a, 17b in proper location as well as properly positioning and retaining the height stop 30, but it also is utilized for providing an opening 35 so that a thixotropic composition can be poured into the pre-mix chamber 22.

It should be noted hereat that the stop 30 has an upper threaded portion 41 whereby a hood 14 may be positioned therethrough so that it may become permanently attached to the circular enclosure 24 by nut means. The hood 14 is made of thin, clear plastic so that the spin coating of the disk 16 may be viewed. The hood 14 is designed such that a cusp 43 is formed into its side wall to aid in recirculating volatile fumes containing air during the spin coating of disk 16. This recirculation enables the composition to remain at a low viscosity for a longer period of time. The hood 14 rests on a U-shaped trough 45 which recovers any excess composition which is spun off the disk 16.

When the spin coating is completed, the entire assembly including mix chamber 22 (i.e., bottom section 18, vanes 32a, b, c, side wall 12 and cover 33) circular enclosure 24, and hood 14 is manually lifted by means of arm 19 and fork member 15 attached thereto. In other words, shaft 10a is separated from shaft 10b. This allows a new disk similar to disk 16 to be spin coated.

The thixotropic composition that is placed in the pre-mix chamber 12 as previously mentioned is composed essentially of iron powder or pigment, a resin binder and a solvent. It is a practice in the art that prior to performing the spin coating, the disk 16 is degreased, rinsed with water and then chromated. The chromating operation provides enhanced adhesion between the aluminum disk 16 and the magnetic particulate film which is to be spin coated thereon. After the disk 16 is prepared in the manner above described, the thixotropic composition is deposited in the pre-mix chamber 22 as above mentioned. The percent by weight of the solvent and solids (i.e., resin and iron pigment) is 80% and 20%, respectively, using the following components, in the proportions tabulated below:

| Components of Composition | Solids Wt. percent |
|---|---|
| Epon 2001 resin (Shell Chem.) | 4.2 |
| Butvar B-93 resin (Monsanto) | 0.7 |
| Methylon resin 95108 (G.E.) | 3.4 |
| Isophorone solvent (Union Carbide) | 40.0 |
| Methyl Cellosolve Acetate solvent (Union Carbide) | 40.0 |
| Iron Pigment (Cobaloy) | 11.0 |
| Total | 99.3 |

Additives on an order of less than 1% comprising Soya lecithin and silicon fluids (viz, PA-111, Dow Corning, and SR-82, G.E.) are added to the above components. Thus, the soya lechithin is added as a grinding aid, and the silicon fluids are added to lower viscosity and provide flow enhancement. Aluminum oxide is also added on an order of 0.4% by weight in order to protect the film surface against magnetic head crashes. Other typical thixotropic compositions may be used in the spin coater assembly 9 such as disclosed in patents U.S. Pat. Nos. 3,781,210 and 3,932,293.

In any event, after the composition above described is added to the mixing chamber 22, the motor 7 is energized for appropriate pre-mixing. Motor 7 is a 3 H.P. induction motor whose speed is controlled by varying its input frequency which may be varied from 0–240 cycles per second. Such a motor together with motor controls may be purchased from PTI Controls of Fullerton, Calif. The method of changing speed and duration at each speed of the induction motor 7 for the present embodiment will be by manual operation for ease of explanation. The term pre-mixing used throughout this invention signifies that by mechanical shearing the attraction between the particles of the composition and its viscosity are reduced to the lowest achievable Newtonian state. Thus, the above composition are premixed at a slow speed of approximately 300 RPM for approximately 10 minutes. In the mixing chamber 22, the composition is made to pass through the vertical vanes 32a, b, c by centrifugal force. In view of the upper curved portion of the vanes 32a, b, c some of the composition is caused to fall inwardly towards the center of the pre-mix chamber and therefore must pass through the vanes that it had previously passed through. Therefore, the composition is more thoroughly mixed by the curves vanes 32a, b, c.

After mixing the composition for 10 minutes at 300 RPM, it is formed into a Newtonian state or a state wherein its viscosity is at the lowest possible value. The Newtonizn state may be expressed in mathematical terms by the formula $\tau = \mu$ dv/dy wherein $\tau$ designates shear stress, $\mu$, dynamic viscosity and dv/dy indicates shear rate. A Newtonian state means that the ratio of the shear stress to the shear rate is constant.

After the composition has reached a Newtonian state and has been thrust by centrifugal force outside of vane 32a, the coils 17a, 17b are electrically energized by manual means so that the side walls 12 (including cover 33) is lifted to provide a circular opening whereby the Newtonian composition may escape and the disk 16 may be flooded therewith. By manual lifting at shaft 10a by means of arm 19 by a distance slightly greater than the depth of Key 13a within slot 13b and simultaneously avoiding contact between cover 33 and lower end of stop 13, the mixing chamber returns to 0 RPM. The spin speed of the spin coater 9 is manually increased to 12,000 RPM for a period of approximately 30 minutes while the Newtonian composition floods disk 16. It should be noted hereat that the timing used with the various speeds is accomplished by manual means, although it should be understood that automatic speed and time controls might be readily provided.

The first and second rotational speeds above described are provided while the hood 14 is snugly placed upon the circular bottom section 18. The utilization of the hood 14 prevents rapid evaporation of the solvent components of the composition used herein and thereby allows a relatively long spin coating time. This is an important aspect of the present invention in that long spinning time (i.e., approximately 30 min.) achieved during high rotational speeds allows an ultra-thin spin coating to be developed in a relatively fluid state. In other words, the centrifugal force will continue to force the composition on disk 16 radially outward and as it does so it becomes progressively thinner. In the present invention, after spinning for approximately one-half hour, the film thickness on the aluminum disk 16 will be on an order of 20 microinches. An ultra-thin magnetic film developed by this invention achieves several benefits chief of which is higher bit density and substantially improved resolution of signals magnectically stored on the disk.

After rotating the disk for one-half hour at 12,000 RPM, the hood 14 is lifted a short distance from the U-channel 45 and the disk is spun at 3 RPM for 1-2 minutes for a purpose of magnetically orienting the iron powder particles circumferentially over the entire coated surface of disk 16. This step is accomplished while the spin coated film is not entirely dry and its purpose is to improve the magnetic recording and reading of information on the disk 16.

The next step of the separation is to manually increase the speed of induction motor 7 by varying its input frequency so that the speed is increased to 300 RPM for 20 seconds for purposes of drying the ultra-thin film spun onto the disk 16.

Finally, the disk 16 is removed from the spin coater assembly 9 by removing the hood 14 via the arm 19 attached to the vertical member 6 and fork 15 which fits under the cap 21. As understood, arm 19 is able to rotate with respect to member 6 by means of coupling 11. After the hood 14 is removed by, in effect, disconnecting shaft 10a from shaft 10b, the spin coated disk 16 is removed and cured for a period of time which will allow the composition to completely harden so that the spun magnetic film may be resistant to head crashes, cleaning solvents and abrasive wear.

What is claimed is:

1. A thin film particulate spin coater apparatus comprising:
   (a) a metallic disk means having a hole located at its center;
   (b) a mixing chamber which is adapted to be positioned over said disk hole;
   (c) means for introducing a thixotropic composition into said chamber, said composition comprising iron powder, a resin and solvent;
   (d) means for rotating said disk and said mixing chamber at a first speed until said composition is in a Newtonian state;
   (e) means for releasing said Newtonian composition onto said rotating disk so that its surface is flooded therewith; and
   (f) means for decoupling the rotation of said mixing chamber and the rotation of said disk and thereafter rotating said disk at a second higher speed; and
   (g) means for controlling the evaporation of said solvent while said disk is spinning at said first and second higher speeds whereby an ultra-thin surface is formed upon said disk surface.

2. The apparatus in accordance with claim 1 wherein said mixing chamber includes:
   (a) vertically positioned vanes which are separated from one another and arranged circumferentially within said chamber,
   (b) each said vane having a plurality of perforations for allowing said composition to be forced therethrough by centrifugal force.

3. The apparatus in accordance with claim 2 wherein said vertically positioned vanes comprise:
   (a) curved portions located at the vane's highest vertical portion,
   (b) whereby said composition may more readily reach the Newtonian state.

4. The apparatus in accordance with claim 1 wherein said means for releasing said Newtonian composition comprises,
   (a) means for raising a side of said mixing chamber, whereby said composition is released onto said metallic disk in a Newtonian state from a center of said disk to its periphery.

5. Apparatus in accordance with claim 1 wherein said means for controlling the evaporation of said solvent while said disk is spinning comprises:
   (a) an adjustable hood means for enclosing said disk.

6. Apparatus in accordance with claim 5, wherein said hood means includes:
   (a) a cusp which is circumferentially arranged on its periphery,
   (b) whereby circulation of solvents and air within said hood may be substantially improved.

7. The apparatus in accordance with claim 1 wherein
   (a) said disk is located on a first shaft, and
   (b) said mixing chamber is located on a second shaft, and
   (c) wherein said first and second shafts may be separated from one another.

8. The apparatus in accordance with claim 7 wherein the means for decoupling the rotation of the mixing chamber from the rotation of the disk comprises:
   (a) lifting means for separating the first and second shaft while retaining the evaporation control means over said rotating disk.

9. The apparatus in accordance with claim 7 including:
   (a) means for limiting the height at which said mixing chamber may be lifted.

10. The apparatus in accordance with claim 8 wherein said lifting means for separating the first and second shaft includes:
    (a) means for separating the first and second shaft to a height whereby said hood and pre-mix chamber may be entirely removed from said disk.

* * * * *